Jan. 2, 1945.   P. W. BAKARIAN   2,366,168
BONDING MAGNESIUM-ALLOY SHEET
Filed May 2, 1942

INVENTOR.
Puzant W. Bakarian
BY
Griswold & Burdick
ATTORNEYS

Patented Jan. 2, 1945

2,366,168

UNITED STATES PATENT OFFICE 2,366,168

BONDING MAGNESIUM-ALLOY SHEETS

Puzant W. Bakarian, Midland, Mich., assignor to The Dow Chemical Company, Midland, Mich., a corporation of Michigan Application May 2, 1942, Serial No. 441,531

3 Claims. (Cl. 29—189)

This invention relates to an improved method of bonding together magnesium-base alloy sheets.

Composite articles consisting of sheets of two or more different magnesium-base alloys united by a firm bond are desirable for a variety of structural purposes. In particular, sheets consisting of a core metal formed of an alloy characterized by extreme strength clad with a thin layer of an alloy of the highly corrosion resistant type are especially useful in that such composite sheets exhibit a combination of the desirable properties of both alloys without the disadvantages of either. A number of methods of forming such composite sheets are known, but none provides a bond between the two sheets which is strong enough to withstand without rupture the severe stresses to which the sheet is sometimes subjected during fabrication and use.

An object of the present invention, then, is to provide an improved method of making composite articles formed of two or more different magnesium-base alloys in which the individual alloy sheets forming the article are held together by a firm strong bond capable of resisting all stresses to which such articles are ordinarily subjected.

In the process of the invention at least one of each two magnesium alloy sheets to be bonded together is sprayed with a molten metal, specifically zinc, cadmium, or alloys thereof with a minor proportion of magnesium, to form a thin film of solid metal on the sheet. The sheets to be bonded are then superimposed one upon the other with the sprayed film at the interface and are heated to a temperature above about 600° F. but below the melting point of the metal constituting the film. These superimposed sheets, while still hot, are then passed together one or more times between rolls adjusted to produce a rate of reduction in thickness of the composite sheet per pass of at least 10 per cent. The generation of heat and mechanical working accompanying this rolling appear to cause diffusion of the zinc or cadmium of the interfacial film into the two adjacent magnesium-base alloy surfaces and thus to form a strong bond between the two sheets.

Figure 1:
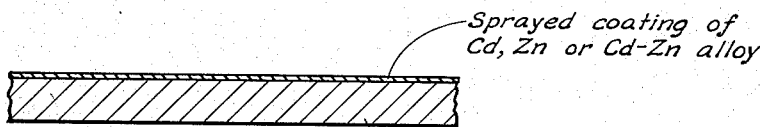
Fig. 1 is an enlarged cross-sectional view of a magnesium-base alloy sheet spray coated with molten bonding metal.

In practice magnesium-base alloy sheets are first carefully cleaned to remove mill scale, organic matter, and any chemical finish which may be present, as by wire brushing, sandblasting, pickling, or alkaline cleaning. At least one of every two sheet surfaces to be bonded together is then sprayed with the molten metal bonding agent to provide as nearly uniform a coating of metal as possible, as shown in Fig. 1, the spraying means being adjusted and operated in known manner to provide a film of deposited metal on the sheet which is between about 0.0005 and about 0.005 inch thick, films of 0.0015 to 0.002 inch being most satisfactory. During the spraying the sheet to be coated is maintained relatively cool, as at room temperature, so that the molten droplets of the metal solidify rapidly to form an adherent uniform skin. The zinc or cadmium spray is preferably produced from a hand-operated "gun" of the type in which a solid wire of the metal to be sprayed is fed into a blast of hot gas such as the "Metco metallizing gun," although other spray devices may be used. Methods of applying the zinc or cadmium film other than spraying have not been found to produce a satisfactory bond.

Figure 2:
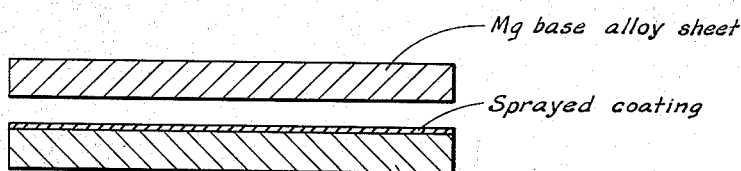
Fig. 2 is an enlarged cross-sectional view of superimposed magnesium-base alloy sheets, one having a sprayed coating of molten bonding metal.
Figure 3:
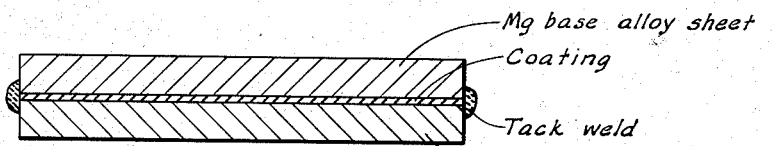
Fig. 3 is an enlarged cross-sectional view showing the sheets of Fig. 2 brought together and tack welded at the sides.

The sheets to be bonded, after spraying, are laid one upon another with the zinc or cadmium film at the interface between them, as shown in Fig. 2, and are then gripped together firmly by mechanical means, as by passing wire or steel tape around the sheets and drawing it tight, or by "tacking" the sheets together at the edges by welding, as shown in Fig. 3. The resulting stack of two or more sheets is then transferred to a suitable oven and heated to a temperature above about 600° F. but below the melting point of the sprayed bonding metal; temperatures of between 675° and 725° F., preferably 690° F., are most satisfactory when zinc is used as the bonding agent.

Figure 4:
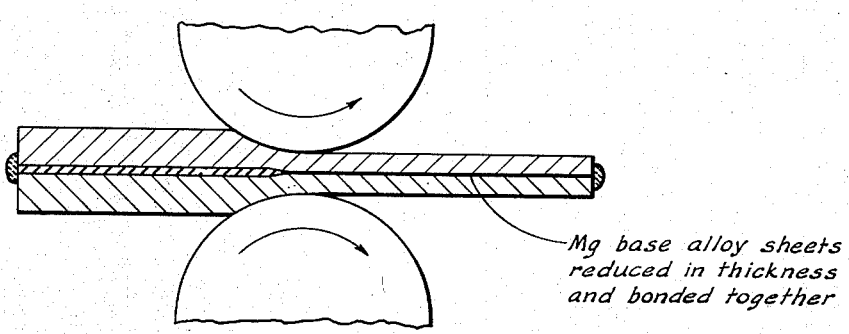
Fig. 4 is a cross-sectional view of the sheets of Fig. 3 being reduced in thickness by rolling, forming a bonded pair of magnesium alloy sheets.

Following the heating, the pack of sheets, while still hot, is passed one or more times through a conventional rolling mill adjusted to produce a reduction in thickness of the pack per pass through the rolls, as shown in Fig. 4, of at least about 10 per cent; reductions of 15 per cent or more per pass are preferred, the maximum rate being about 60 per cent. After the rolling step, the wires or other securing means may be removed, the sheets constituting the rolling pack being found to be bonded together very firmly. The composite article thus formed may then be subjected to further rolling and annealing operations desired to develop any range of physical characteristics of which the metal is capable, and may be cut, punched, drawn, or otherwise shaped without danger of rupturing the bond between the original sheets.

In so far as is known, the process of the invention may satisfactorily be applied to bonding together sheets formed of any two different magnesium-base alloys. As a practical matter, however, the invention finds its greatest application in cladding high strength magnesium-base alloys containing aluminum in a quantity up to 10 per cent as the major alloying element with highly corrosion resistant alloys containing manganese in a quantity up to 2 per cent as the major alloying element. In this way there is formed a composite article having a high strength core and surfaces of high corrosion resistance.

The following example will further illustrate the invention, but is not to be construed as limiting the scope:

Example

A 0.5 x 4 x 8 inch extruded slab of Dowmetal J (a magnesium-base alloy containing 6.5 per cent aluminum, 0.2 per cent manganese, and 0.7 per cent zinc, the balance being magnesium) was carefully cleaned and sandblasted and was sprayed on both sides with molten zinc to form a uniform skin of zinc 0.0005 inch thick upon each side. Similarly sized sheets of Dowmetal M (a magnesium-base alloy containing 1.5 per cent manganese, the balance being magnesium) 0.030 inch thick were then placed on each side of the sprayed sheet to form a packet, and the latter was wired securely. The packet was then introduced into a heat-treating oven and heated for one hour at a temperature of 700° F., after which it was withdrawn from the oven and passed twice through a conventional rolling mill adjusted to produce a total reduction in thickness of 15 per cent on each pass. The sheet was then reheated to a temperature of 700° F. and again passed repeatedly through the mill at a reduction of 15 per cent per pass until a total thickness of 0.090 inch was reached. The resulting sheet exhibited a firm strong bond between the individual sheet elements.

Other modes of applying the principle of the invention may be employed instead of those explained, change being made as regards the details described, provided the steps recited in any of the following claims or the equivalent thereof be used.

I claim:

1. The method of bonding together sheets formed of different magnesium-base alloys which comprises: spraying a molten metal selected from the class consisting of zinc, cadmium, and alloys thereof with a minor proportion of magnesium upon a surface of at least one of the sheets to be bonded to form thereon a film of solid metal having a thickness between about 0.0005 and about 0.005 inch; superimposing the sheets one upon the other with the metal coating at the interface; heating the sheets to a temperature above about 600° F. but below the melting point of the metal forming the coating while holding the sheets together; and passing the superimposed heated sheets together through rolls at a rate of reduction in thickness per pass between about 10 and about 60 per cent.

2. The method of bonding together sheets formed of different magnesium-base alloys which comprises: spraying molten zinc on the surface of at least one of the sheets to be bonded to form thereon a film of solid zinc having a thickness between about 0.0005 and about 0.002 inch; superimposing the sheets one upon the other with the zinc coating at the interface; heating the sheets to a temperature between about 675° and about 725° F. while holding the sheets together; and passing the superimposed heated sheets together through rolls at a rate of reduction in thickness per pass between about 15 and about 60 per cent.

3. The method of bonding a sheet formed of a magnesium-base alloy containing manganese in a quantity up to 2 per cent by weight as the major alloying element to a sheet formed of a magnesium-base alloy containing aluminum in a quantity up to 10 per cent as the major alloying element which comprises; spraying molten zinc on the surface of at least one of the sheets to form thereon a film of solid zinc about 0.0005 to 0.002 inch thick; superimposing the sheets one upon the other with the zinc coating at the interface; heating the sheet to a temperature of about 690° F. while holding the sheets together; and passing the superimposed sheets together through rolls at a rate of reduction in thickness per pass of about 15 per cent.

PUZANT W. BAKARIAN.